United States Patent [19]

Peyton

[11] Patent Number: 5,776,583

[45] Date of Patent: Jul. 7, 1998

[54] FLOOR MAT SYSTEM

[76] Inventor: Kirby K. Peyton, 127 Simmons Blvd., Brampton, Ontario, Canada, L6V 3X4

[21] Appl. No.: 749,517

[22] Filed: Nov. 18, 1996

[51] Int. Cl.$^6$ ............................................. B60N 3/04
[52] U.S. Cl. ...................... 428/120; 428/138; 428/167; 428/169; 296/97.23
[58] Field of Search ................................. 428/120, 138, 428/167, 169; 296/97.23

[56] References Cited

U.S. PATENT DOCUMENTS

| | | | |
|---|---|---|---|
| 3,488,081 | 1/1970 | Nolen | 296/97.23 |
| 4,420,180 | 12/1983 | Dupont et al. | 296/97.23 |

Primary Examiner—Alexander Thomas

[57] ABSTRACT

A new Floor Mat System for catching and storing water and debris fallen from the shoes of motorists. The inventive device includes an upper portion, a lower portion and a storage means contained within the lower portion.

12 Claims, 3 Drawing Sheets

FLOOR MAT SYSTEM

BACKGROUND OF THE INVENTION

1. Field of the Invention

The present invention relates to floor mats for use in automobiles and more particularly pertains to a new Floor Mat System for catching and storing water and debris fallen from the shoes of motorists.

2. Description of the Prior Art

The use of floor mats for use in automobiles is known in the prior art. More specifically, floor mats for use in automobiles heretofore devised and utilized are known to consist basically of familiar, expected and obvious structural configurations, notwithstanding the myriad of designs encompassed by the crowded prior art which have been developed for the fulfillment of countless objectives and requirements.

Known prior art floor mats for use in automobiles include U.S. Pat. Nos. 4,765,670; 4,420,180; and 5,154,961.

While these devices fulfill their respective, particular objectives and requirements, the aforementioned patents do not disclose a new Floor Mat System. The inventive device includes an upper portion, a lower portion and a storage means contained within the lower portion.

In these respects, the Floor Mat System according to the present invention substantially departs from the conventional concepts and designs of the prior art, and in so doing provides an apparatus primarily developed for the purpose of catching and storing water and debris fallen from the shoes of motorists.

SUMMARY OF THE INVENTION

In view of the foregoing disadvantages inherent in the known types of floor mats for use in automobiles now present in the prior art, the present invention provides a new Floor Mat System construction wherein the same can be utilized for catching and storing water and debris fallen from the shoes of motorists.

The general purpose of the present invention, which will be described subsequently in greater detail, is to provide a new Floor Mat System apparatus and method which has many of the advantages of the floor mats for use in automobiles mentioned heretofore and many novel features that result in a new Floor Mat System which is not anticipated, rendered obvious, suggested, or even implied by any of the prior art floor mats for use in automobiles, either alone or in any combination thereof.

To attain this, the present invention generally comprises an upper portion, a lower portion and a storage means contained within the lower portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the invention to provide a new Floor Mat System apparatus and method which has many of the advantages of the floor mats for use in automobiles mentioned heretofore and many novel features that result in a new Floor Mat System which is not anticipated, rendered obvious, suggested, or even implied by any of the prior art floor mats for use in automobiles, either alone or in any combination thereof.

It is another object of the present invention to provide a new Floor Mat System which may be easily and efficiently manufactured and marketed.

It is a further object of the present invention to provide a new Floor Mat System which is of a durable and reliable construction.

An even further object of the present invention is to provide a new Floor Mat System which is susceptible of a low cost of manufacture with regard to both materials and labor, and which accordingly is then susceptible of low prices of sale to the consuming public, thereby making such Floor Mat System economically available to the buying public.

Still yet another object of the present invention is to provide a new Floor Mat System which provides in the apparatuses and methods of the prior art some of the advantages thereof, while simultaneously overcoming some of the disadvantages normally associated therewith.

Still another object of the present invention is to provide a new Floor Mat System for catching and storing water and debris fallen from the shoes of motorists.

Yet another object of the present invention is to provide a new Floor Mat System which includes an upper portion, a lower portion and a storage means contained within the lower portion.

Still yet another object of the present invention is to provide a new Floor Mat System that protects the carpeting and floorboards of the automobile.

Even still another object of the present invention is to provide a new Floor Mat System that is easy to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be

3 had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
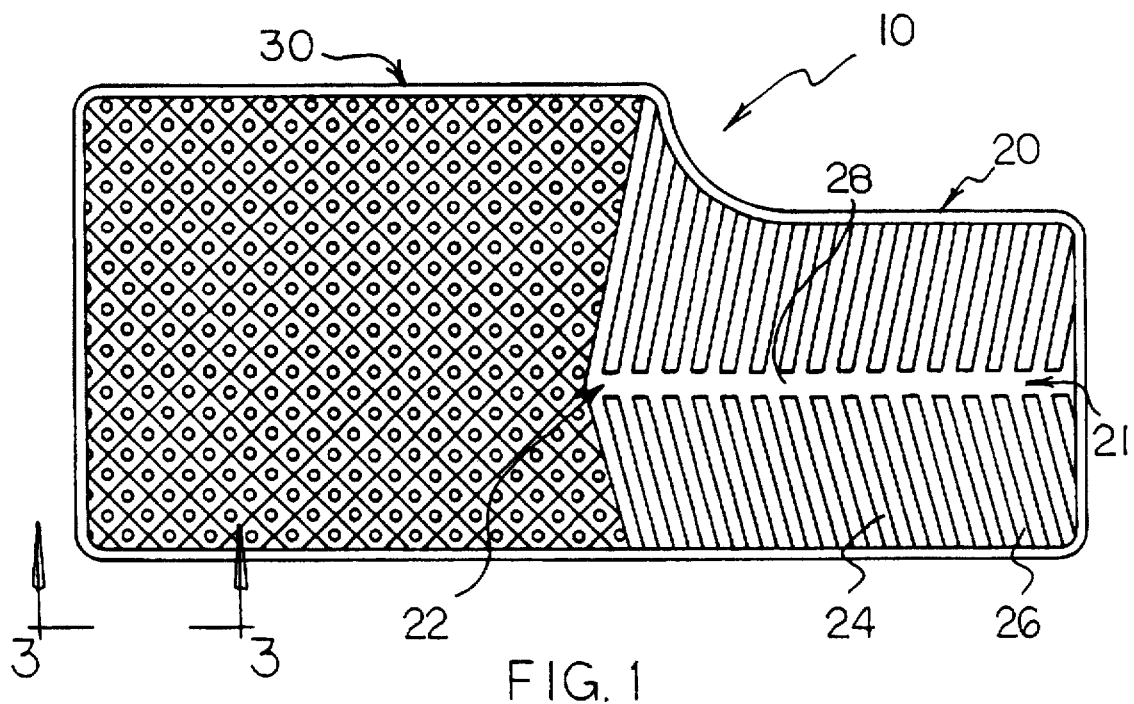
FIG. 1 is a top plan view of a new Floor Mat System according to the present invention.

With reference now to the drawings, and in particular to FIGS. 1 through 6 thereof, a new Floor Mat System embodying the principles and concepts of the present invention and generally designated by the reference numeral 10 will be described.

More specifically, it will be noted that the Floor Mat System 10 comprises an upper portion 20, a lower portion 30 connected to the upper portion 20 at an upper portion bottom section 22, and a means for storing liquid and debris disposed within the lower portion 30. The upper portion 20 and the lower portion 30 are formed of molded rubber or other suitable material.

Figure 6:
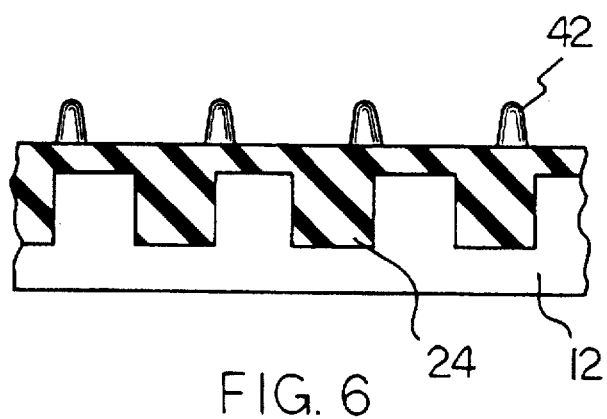
FIG. 6 is a cross sectional view taken along line 6—6 of FIG. 4.

With reference to FIG. 1, the Floor Mat System 10 of the present invention is shown including the upper portion 20 shaped to fit on an inclined surface such as the surface under the control pedals of a motor vehicle. The upper portion 20 includes a top section 21 and the bottom section 22. Angled from the top section 21 toward the bottom section are a plurality of integrally formed angled, spaced-apart ridges 24. The angled, spaced-apart ridges 24 extend from an integrally formed upper portion peripheral wall 12 (FIG. 4) and terminate at a center channel 28, forming angled channels 26 therebetween (FIG. 6).

Figure 4:
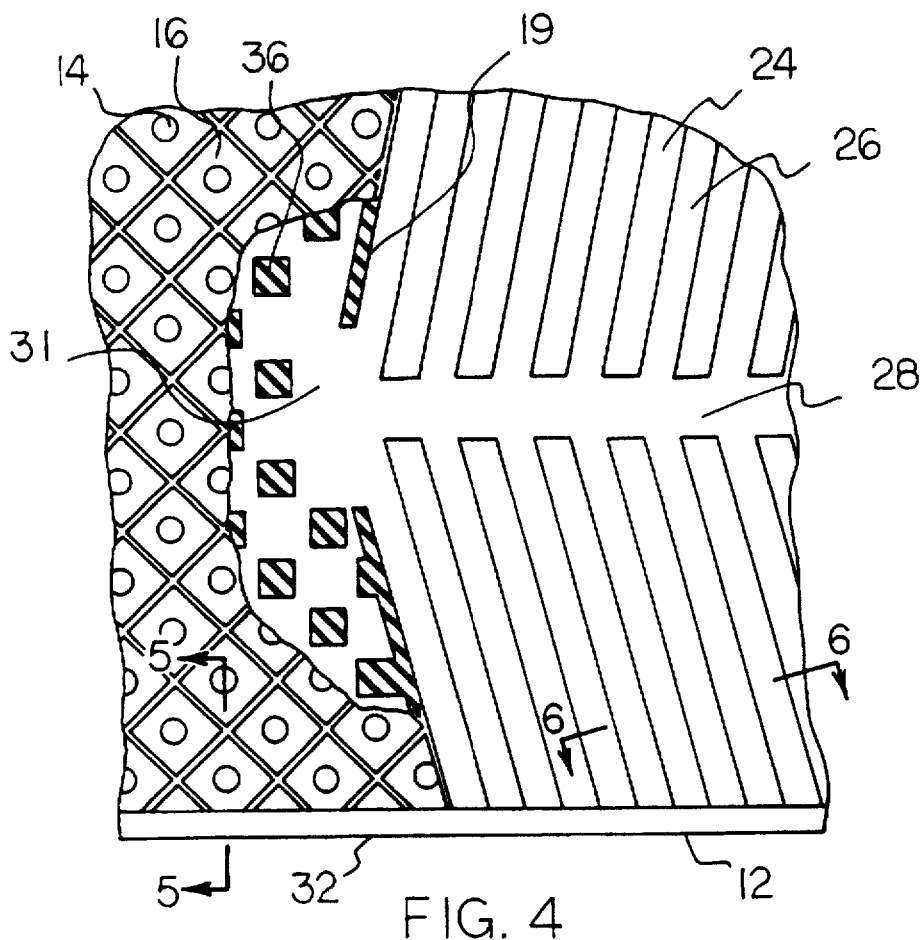
FIG. 4 is an enlarged fragmentary view of the invention partially cut away to reveal the inner structure of the lower portion.

With reference to FIG. 4, the center channel 28 extends from the upper portion top section 21 and terminates at a storage area inlet 31. The center channel 28 is in flow communication with the angled channels 26. The storage area inlet 31 is formed at the boundary between the upper portion 20 and the lower portion 30 and is defined by a pair of integrally formed angled walls 19 that are substantially parallel to the angled, spaced-apart ridges 24 and extend from an integrally formed lower portion peripheral wall 32 and terminating at the storage area inlet 31.

Figure 5:
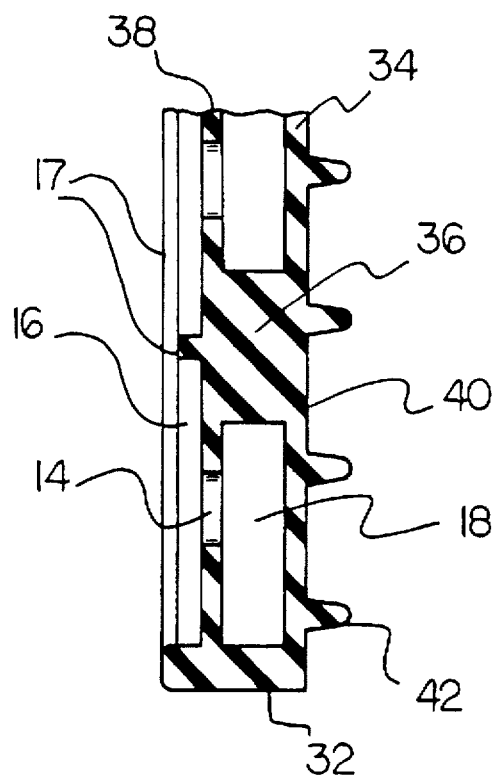
FIG. 5 is a cross sectional view taken along line 5—5 of FIG. 4.

With continued reference to FIG. 4, drainage compartments 16 are shown including drainage apertures 14 formed in a lower portion upper layer 38 and surrounded by integrally formed containing walls 17. The drainage apertures are in flow communication with a storage area 18 which is bounded by the lower portion upper layer 38, a lower portion bottom layer 34, the lower portion peripheral wall 32 and the angled walls 19 (FIG. 5). Supports 36 are integrally formed between the lower portion upper layer 38 and the lower portion bottom layer 34 and are disposed so as to maintain the storage area 18 between the lower portion upper layer 38 and the lower portion bottom layer 34.

Figure 2:
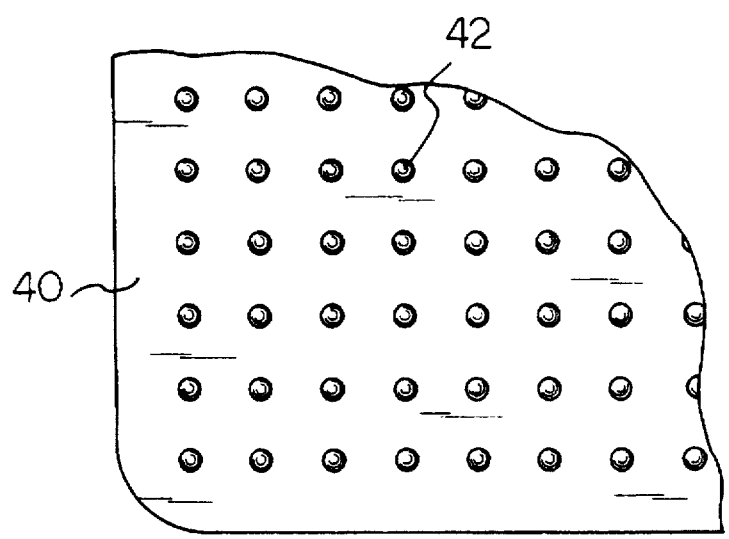
FIG. 2 is a partial bottom plan view thereof.
Figure 3:
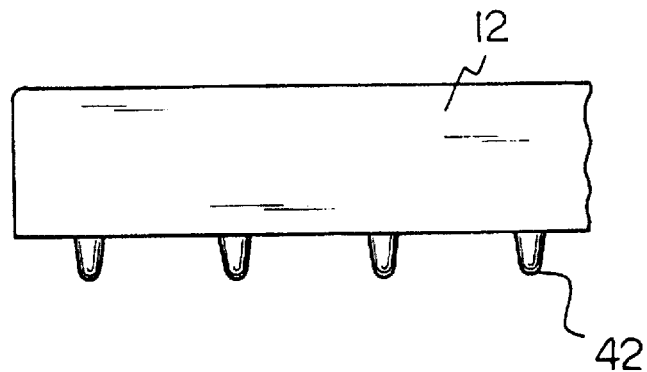
FIG. 3 is cross section view taken along line 3—3 of FIG. 1.

With reference to FIG. 2, the Floor Mat System has a back surface 40 including a plurality of ribs 42 disposed thereon. Nibs 42 provide friction between the back surface 40 and the surfaces of the motor vehicle so as to prevent slippage.

In use, the Floor Mat System 10 is placed with the back surface facing the motor vehicle surfaces. The upper portion 20 is placed on the inclined surface, such as under the control pedals, and the lower portion 30 then lays substantially flat against the floor board surface. Liquid and debris fallen from the shoes of motorists is caught in the angled channels 26 of the upper portion 20 and the drainage compartments 16 of the lower portion 30. The liquid and debris thus caught flows into the storage area 18 by means of the center channel 28 in the case of liquid and debris caught in the angled channels 26 and by means of apertures 14 in the case of liquid and debris caught in the drainage compartments 16. The storage area 18 can be emptied when needed by removing the Floor Mat System 10 from the vehicle and bending it at the boundary between the upper portion 20 and lower portion 30 thus forcing the liquid and debris stored therein to flow out of the storage area inlet 31 into an appropriate receptacle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A Floor Mat System comprising:

an upper portion;

a lower portion connected to the upper portion at an upper portion bottom section; and a plurality of drainage compartments formed on a lower portion upper layer and a storage area disposed thereunder, the drainage compartments further having an aperture formed in the lower portion upper layer surrounded by a containing wall, the aperture being in flow communication with the storage area.

2. The Floor Mat System of claim 1, wherein the upper portion further comprises a plurality of angled, spaced-apart ridges formed integrally thereon, the angled, spaced-apart ridges being angled from an upper portion top section toward the upper portion bottom section on opposing sides of the upper portion and terminating at a center channel, the center channel extending from the upper portion top section and terminating at a storage area inlet, the center channel being in flow communication with a plurality of angled channels formed between the spaced-apart ridges.

3. The Floor Mat System of claim 1, wherein the storage area further comprises a space bounded by the lower portion upper layer, a lower portion bottom layer, a lower portion peripheral wall and a pair of angled walls disposed substantially parallel to the angled, spaced-apart ridges and extending from the lower portion peripheral wall and defining the storage area inlet.

4. The Floor Mat System of claim 3, wherein the storage area further comprises a plurality of integrally formed supports disposed between the lower portion upper layer and the lower portion bottom layer.

5. The Floor Mat System of claim 4, wherein the lower portion bottom layer further comprises a back surface, the back surface having a plurality of nibs disposed thereon.

6. The Floor Mat System of claim 5, wherein the upper portion further comprises an upper portion peripheral wall extending around the periphery of the upper portion.

7. The Floor Mat System of claim 6, wherein the upper portion is adapted to fit on an inclined surface such as the surface under the control pedals of a motor vehicle and the bottom portion is adapted to lay substantially flat on the floor board of the motor vehicle.

8. The Floor Mat System of claim 1, wherein the upper portion further comprises an upper portion peripheral wall extending around the periphery of the upper portion.

9. The Floor Mat System of claim 8, wherein the upper portion is adapted to fit on an inclined surface such as the surface under the control pedals of a motor vehicle and the bottom portion is adapted to lay substantially flat on the floor board of the motor vehicle.

10. The Floor Mat System of claim 1 further comprises a lower portion bottom layer, the lower portion bottom layer having a back surface, the back surface having a plurality of nibs disposed thereon.

11. The Floor Mat System of claim 1, wherein the storage area further comprises a plurality of integrally formed supports disposed between the lower portion upper layer and the lower portion bottom layer.

12. A Floor Mat System for use in catching and storing water and debris fallen from the shoes of motorists within the mat, comprising an upper portion, a lower portion connected to the upper portion at an upper portion bottom section and a means for storing liquid and debris within the lower portion wherein the upper portion further comprises a plurality of angled, spaced-apart ridges formed integrally thereon, the angled, spaced-apart ridges being angled from an upper portion top section toward the upper portion bottom section on opposing sides of the upper portion and terminating at a center channel, the center channel extending from the upper portion top section and terminating at a storage area inlet, the center channel being in flow communication with a plurality of angled channels formed between the spaced-apart ridges, and wherein the means for storing liquid and debris further comprises a plurality of drainage compartments formed on a lower portion upper layer and a storage area disposed thereunder, the drainage compartments further comprising an aperture formed in the lower portion upper layer surrounded by a containing wall, the aperture being in flow communication with the storage area, the storage area further comprising a space bounded by the lower portion upper layer, a lower portion bottom layer, a lower portion peripheral wall, a pair of angled walls disposed substantially parallel to the angled, spaced-apart ridges and extending from the lower portion peripheral wall and defining the storage area inlet and a plurality of integrally formed supports disposed between the lower portion upper layer and the lower portion bottom layer wherein the liquid and debris fallen from the shoes of motorists is caught in the angled channels and drainage compartments and flows into the storage area.

* * * * *